United States Patent
Keller (10) Patent No.: US 11,420,675 B2
(45) Date of Patent: Aug. 23, 2022

(54) MULTIDIRECTIONAL TRANSPORT VEHICLE

(71) Applicant: HUBTEX MASCHINENBAU GMBH & CO. KG, Fulda (DE)

(72) Inventor: Juergen Keller, Grossenlueder (DE)

(73) Assignee: HUBTEX MASCHINENBAU GMBH & CO. KG, Fulda (DE)

( * ) Notice: Subject to any disclaimer, the term of this patent is extended or adjusted under 35 U.S.C. 154(b) by 169 days.

(21) Appl. No.: 16/979,533

(22) PCT Filed: Feb. 20, 2019

(86) PCT No.: PCT/EP2019/054170
§ 371 (c)(1),
(2) Date: Sep. 10, 2020

(87) PCT Pub. No.: WO2019/174875
PCT Pub. Date: Sep. 19, 2019

(65) Prior Publication Data
US 2020/0406965 A1    Dec. 31, 2020

(30) Foreign Application Priority Data
Mar. 13, 2018    (DE) .................. 10 2018 105 712.1

(51) Int. Cl.
*B62D 7/15* (2006.01)
*B66F 9/075* (2006.01)
(Continued)

(52) U.S. Cl.
CPC ........ *B62D 7/1509* (2013.01); *B66F 9/07568* (2013.01); *B62D 1/04* (2013.01); *B62D 1/12* (2013.01)

(58) Field of Classification Search
CPC .......... B62D 7/1509; B62D 1/04; B62D 1/12; B62D 1/14; B66F 9/07568
See application file for complete search history.

(56) References Cited

U.S. PATENT DOCUMENTS 5,111,901 A * 5/1992 Bachhuber ........... B62D 7/1509
180/415
7,464,785 B2 * 12/2008 Spark ...................... B60T 8/246
180/242

(Continued)

FOREIGN PATENT DOCUMENTS

DE      201 07 719 U1    10/2002
DE      101 22 033 A1    11/2002
(Continued)

*Primary Examiner* — Tony H Winner
(74) *Attorney, Agent, or Firm* — Norman B. Thot (57) ABSTRACT

A multidirectional transport vehicle includes a longitudinal axis which defines a longitudinal direction, a transverse axis which defines a transverse direction, a steering system, a driving direction switch, and a driving direction adjustment element. The steering system comprises at least three independently steerable wheels and a steering target value transmitter which steers the wheels. Each wheel has a wheel axle. A steering pole, on which each wheel axle is aligned when cornering, is moved along a steering pole axis by actuating the steering target value transmitter. The driving direction switch includes a limited number of separate switch positions, wherein exactly one switch position preselects exactly one respective rotational position of the steering pole axis relative to the multidirectional transport vehicle and preselects one of two driving directions facilitated thereby. The driving direction adjustment element changes a preselectable rotational position of the steering pole axis.

8 Claims, 4 Drawing Sheets

(51) Int. Cl.
*B62D 1/04* (2006.01)
*B62D 1/12* (2006.01)

(56) References Cited

U.S. PATENT DOCUMENTS

| | | | |
|---|---|---|---|
| 2004/0129491 A1* | 7/2004 | Bean | B60B 35/1054 |
| | | | 180/21 |
| 2005/0217906 A1* | 10/2005 | Spark | B62D 9/00 |
| | | | 180/22 |
| 2013/0030656 A1 | 1/2013 | Keller | |
| 2015/0134202 A1* | 5/2015 | Dawson | B62D 7/14 |
| | | | 701/41 |
| 2015/0191202 A1 | 7/2015 | Otterbein | |

FOREIGN PATENT DOCUMENTS

| | | |
|---|---|---|
| DE | 10 2004 055 282 A1 | 6/2006 |
| DE | 10 2012 105 831 A1 | 1/2014 |
| DE | 10 2013 101 115 A1 | 8/2014 |
| WO | WO 01/70556 A1 | 9/2001 |
| WO | WO 2011/128222 A1 | 10/2011 |

* cited by examiner

MULTIDIRECTIONAL TRANSPORT VEHICLE

CROSS REFERENCE TO PRIOR APPLICATIONS

This application is a U.S. National Phase application under 35 U.S.C. § 371 of International Application No. PCT/EP2019/054170, filed on Feb. 20, 2019 and which claims benefit to German Patent Application No. 10 2018 105 712.1, filed on Mar. 13, 2018. The International Application was published in German on Sep. 19, 2019 as WO 2019/174875 A1 under PCT Article 21(2).

FIELD

The present invention relates to a multidirectional transport vehicle having a steering system with at least three independently steerable wheels and a steering target value transmitter which steers the wheels, in particular via a steering program, wherein a steering pole, on which the axles of the wheels are aligned when cornering, is moved along a steering pole axis by actuation of the steering target value transmitter.

BACKGROUND

A multidirectional transport vehicle having such a steering system has previously been described, for example, in WO 01/70556 A1. The steering program in this vehicle, also referred to as "all-wheel steering", can be changed while driving to a second steering program for rotating the steering pole axis of all wheels in the same direction by actuating the steering target value transmitter, also referred to as "diagonal steering". When the steering target value transmitter is actuated, in the case of all-wheel steering, the steered wheels are actuated so that their axes of rotation always intersect the steering pole. In the case of diagonal steering, the wheels are steered according to the actuation of the steering target value transmitter so that the axes of rotation of the wheels run parallel, i.e., the steering pole is located at infinity. When the steering target value generator is actuated with diagonal steering selected, the vehicle carries out a change of direction, but without changing its orientation, whereas if all-wheel steering is selected, the orientation of the vehicle follows the driving direction.

In order to be able to change the orientation of the vehicle relative to its driving direction regardless of the currently selected steering program, a further control element is provided in this vehicle which, if necessary, can be actuated simultaneously with the steering target value transmitter. The actuation of this second control element leads to correction of the steering angle of the wheels of at least one axle in a manner that does not correspond to the selected steering program, and in fact is approximately proportional to the deflection of this control element, which is designed as a joystick.

Another steering system for a multidirectional transport vehicle was previously described in EP 1 657 149 B1. Two further operating elements are provided in this steering system in addition to the steering target value transmitter, which always operates according to the program "all-wheel steering" program: a first operating element for continuously moving the steering line; and a second operating element for continuously controlling the main direction of the vehicle. This measure should create an intuitive steering which completely dispenses with firmly defined steering programs in order to achieve greater flexibility of the steering system.

A disadvantage of the aforementioned prior art is that, for the driver, many degrees of freedom for input exist and the steering of such a vehicle requires considerable practice and also considerable concentration during daily operation if undesirable driving situations, which are sometimes difficult to control, are to be avoided.

SUMMARY

An aspect of the present invention is to provide a multidirectional transport vehicle having a steering system which provides sufficient flexibility of steering a multidirectional transport vehicle but which is easier for a driver to operate.

In an embodiment, the present invention provides a multidirectional transport vehicle which includes a longitudinal axis which defines a longitudinal direction, a transverse axis which defines a transverse direction, a steering system, a driving direction switch, and a driving direction adjustment element. The steering system comprises at least three wheels, each of which is configured to be independently steerable, and a steering target value transmitter which is configured to steer the at least three wheels. Each of the at least three wheels has a wheel axle. A steering pole, on which each wheel axle of the at least three wheels is aligned when cornering, is moved along a steering pole axis by actuating the steering target value transmitter. The driving direction switch comprises a limited number of separate switch positions, wherein exactly one switch position of the driving direction switch preselects exactly one respective rotational position of the steering pole axis relative to the multidirectional transport vehicle and preselects one of two driving directions facilitated thereby. The driving direction adjustment element is different from the steering target value transmitter. The driving direction adjustment element is configured to change a preselectable rotational position of the steering pole axis.

BRIEF DESCRIPTION OF THE DRAWINGS

The present invention is described in greater detail below on the basis of embodiments and of the drawings in which.

DETAILED DESCRIPTION

The multidirectional transport vehicle according to the present invention has a longitudinal axis that defines a longitudinal direction and a transverse axis that defines a transverse direction. The multidirectional transport vehicle has at least three independently steerable wheels, for example, four independently steerable wheels, and a steering target value transmitter which steers the wheels, wherein a steering pole, with which the axles of the wheels are aligned when cornering, is moved along a steering pole axis by actuation of the steering target value transmitter.

A driving direction switch is provided which has a limited number of switch positions which are separate from one another.

Using precisely one switch position of the driving direction switch, it is possible to preselect both a respective precise rotational position of the steering pole axis relative to the vehicle and also one of the two possible driving directions in this case.

Via precisely one switching operation on the driving direction switch, not only is the orientation of the driving movement preselected, for example, longitudinal driving or transverse driving, but simultaneously also the direction in which driving takes place, for example, driving in the longitudinal direction, namely, forwards. This creates a prerequisite for a particularly simple, intuitive operation of the steering system. The driving direction switch can, for example, be different from the steering target value transmitter.

A driving direction adjustment element is provided which is different from the steering target value transmitter and via which the preselected rotational position of the steering pole axis can be changed, for example, continuously variably. A high flexibility of the multidirectional transport vehicle can thereby be achieved.

The expressions "changing the rotational position of the steering pole axis" and "rotation of the steering pole axis" are used synonymously herein.

For the multidirectional transport vehicle according to the present invention, it is not necessary for the steering target value transmitter to take on a function other than moving the steering pole on the steering pole axis. A compromise between a limited number of defined preselectable driving states and the possibility of deviating therefrom, in particular continuously variably, is moreover achieved which provides a high degree of flexibility and a simple learning of the control.

An operating element can, for example, be provided via which the driving speed target value is selectable. This element may, for example, be an accelerator pedal or a function of a joystick, for example, the joystick moved forward and back.

In an embodiment of the present invention, depending upon which driving direction has been preselected by the driving direction switch when the driving direction switch is actuated, the actuation of the driving direction switch effects a reversal of the driving direction or a change of the rotational position of the steering pole axis relative to the vehicle. The change of the rotational position of the steering pole axis can, for example, effect a change of the driving direction.

During a change of the driving direction triggered by actuation of the driving direction switch, the steering system can, for example, effect a smooth change of driving direction during driving.

A gradual change of the rotational position of the steering pole axis, for example, by at most 90° in both directions can, for example, be possible with the driving direction adjustment element.

A change of the rotational position of the steering pole axis proportionately to its actuation can, for example, be achieved with the driving direction adjustment element.

The driving direction adjustment element can, for example, be rotatable, for example, at least approximately about the vertical axis of the vehicle.

If the driving direction adjustment element is rotatable, then activation thereof can, for example, effect a rotation of the steering pole axis that is proportionate to its rotation and, for example, in the direction in which it is rotated.

The driving direction switch can, for example, preselect one of the following driving directions, and in an embodiment exclusively:
longitudinal driving in a first driving direction, for example, forward;
longitudinal driving in a second driving direction which is opposed to the first driving direction, for example, backwards;
transverse driving in a first driving direction, for example, to the right;
transverse driving in a second driving direction which is opposed to the first driving direction, for example, to the left.

The driving direction switch can, for example, have a switch position for preselecting longitudinal driving in a first driving direction of the vehicle and a further switch position, different therefrom, for preselecting longitudinal driving in a second driving direction of the vehicle which his opposed to the first driving direction. The driving direction switch can, for example, have a switch position for preselecting transverse driving of the vehicle in a first driving direction and a further switch position, different therefrom, for preselecting transverse driving in a second driving direction which is opposed to the first driving direction.

In the event of preselection of longitudinal driving of the vehicle in a first driving direction or longitudinal driving in a second driving direction which is opposed to the first driving direction of the vehicle, the steering pole axis can, for example, be rotated in parallel with the transverse axis of the vehicle if it is not already located in this position at the time of the preselection and, depending on the preselection, the direction of the longitudinal driving in the first or second driving direction is fixed. In the event of preselection of transverse driving in a first driving direction or transverse driving in a second driving direction which is opposed to the first driving direction, the steering pole axis can, for example, be rotated in parallel with the longitudinal axis of the vehicle if it is not already located in this position at the time of the preselection.

The driving direction switch can, for example, be correctly positioned with respect to the longitudinal axis and the transverse axis of the vehicle so that the switch position of the driving direction switch in the vehicle corresponds to the direction in respect of which it effects the driving direction preselection. A particularly simple and intuitive operability of the steering system is thereby achieved. In the case of a driving direction switch arranged on the driving direction adjustment element, this can, for example, apply in any case if the driving direction adjustment element is not actuated.

The driving direction switch can, for example, comprise four separate switch positions.

The driving direction switch can, for example, be arranged in the vehicle to form two switch positions spaced apart from one another along the longitudinal axis and two switch positions spaced apart from one another along the transverse axis of the vehicle. In the case of a driving direction switch arranged on the driving direction adjustment element, this can, for example, apply in any case if the driving direction adjustment element is not actuated. The longitudinal driving in the two possible driving directions can be preselected by the two switch positions along the longitudinal axis, and the transverse driving in the two possible directions can be preselected by the two switch positions along the transverse axis of the vehicle.

In an embodiment, the imaginary connecting lines between the two switch positions of the driving direction switch extending along the longitudinal axis and the two switch positions extending along the transverse axis can, for example, intersect between the switch positions, and in this embodiment the driving direction switch can also be designated as a cross-switching element. The cross-switching element can, for example, comprise four switch positions which are separate, i.e., for example, do not merge into one another, for example, precisely four switch positions.

In an embodiment, the cross-switching element can, for example, comprise a rocker switch having two actuation axes extending perpendicular with respect to one another. One of the two actuation axes can, for example, extend at least approximately in the direction of the longitudinal axis of the vehicle and the other actuation axis can, for example, extend approximately in the direction of the transverse axis of the vehicle.

In the case of a driving direction switch arranged on the driving direction adjustment element, this can, for example, apply in any case if the driving direction adjustment element is not actuated.

If the two actuation axes do not extend, for example, at least approximately horizontally, then one of the two actuation axes can, for example, extend at least approximately in the plane consisting of the vertical axis and longitudinal axis of the vehicle and the other actuation axis can then, for example, extend at least approximately in the plane consisting of the vertical axis and transverse axis of the vehicle. In the case of a driving direction switch arranged on the driving direction adjustment element, this can, for example, apply in any case if the driving direction adjustment element is not actuated.

The driving direction switch and/or the driving direction adjustment element can, for example, comprise a feeler, a pulling element, a tilting element, a rocking and/or a rotary element, for example, in the form of a joystick.

The driving direction switch can, for example, be arranged on the driving direction adjustment element. In an embodiment, the driving direction switch can, for example, be integrated into the driving direction adjustment element. The driving direction switch can, for example, be arranged on the driving direction adjustment element so that during actuation of the driving direction adjustment element, the driving direction switch moves therewith. If the driving direction adjustment element is, for example, rotatable, then the driving direction switch can, for example, be co-rotatable therewith. If the driving direction adjustment element comprises, for example, a joystick, then the driving direction switch can, for example, be integrated into the head of the joystick.

The driving direction switch can, for example, comprise a feeler, a pulling element, a tilting element, a rocking and/or a rotary element.

If the driving direction adjustment element is, for example, rotatable, it can then, for example, be configured in any manner which allows rotation of the steering pole axis as a function of the deflection of the driving direction adjustment element out of its central position. The driving direction adjustment element can, for example, comprise a joystick.

The steering target value transmitter can be configured in any manner which allows a movement of the steering pole on the steering pole axis as a function of the deflection of the steering target value transmitter out of its central position. The steering target value transmitter can, for example, comprise a joystick, for example, a steering wheel, therefor.

The rotational position of the steering pole axis relative to the vehicle can, for example, be preselected by the driving direction switch regardless of whether and how far the steering pole axis was previously rotated by the driving direction adjustment element. A specific actuation of the driving direction switch can, therefore, for example, always cause the steering pole axis to be brought into precisely the same rotational position relative to the vehicle regardless of the rotational position in which it is located at the time of the actuation.

In an embodiment, an actuation of the driving direction switch after prior actuation of the steering target value transmitter can, for example, cause the rotation of the steering pole axis into a rotational position perpendicular to the preselected driving direction if it is not already arranged in this position. This can, for example, take place so that the position of the steering pole on the steering pole axis is maintained. Any rotation of the steering pole axis can, for example, take place so that the direction of rotation of the vehicle caused by the steering target value transmitter is maintained.

For driving straight ahead, the steering pole axis extends in parallel with the wheel axles, i.e., perpendicular to the driving direction. With the steering target value transmitter actuated, the steering pole axis can, for example, extend perpendicular with respect to the tangent of the cornering. The steering pole axis can, for example, always extend through the center of the vehicle. The steering pole axis can, for example, merely be rotatable, but not displaceable. The steering pole axis can, for example, be rotatable exclusively about one single point. The steering pole axis can, for example, be rotatable exclusively about the center of the vehicle. A change of the rotational position of the steering pole axis can, for example, effect steering of the wheels.

As used herein, driving in the direction of the longitudinal axis of the vehicle, which may extend straight or along a curve, is designated as longitudinal driving. As used herein, driving in the direction of the transverse axis of the vehicle, which may extend straight or along a curve, is designated as transverse driving.

The longitudinal axis of the vehicle can, for example, extend toward the normal direction of movement of the vehicle. The longitudinal axis of the vehicle can, for example, extend from the center of the vehicle to the front end of the vehicle. As used herein, longitudinal driving in which the front side is at the front is also designated as forward driving, longitudinal driving with a reverse driving direction is also designated as backward driving, transverse driving toward the right when viewed in the forward driving direction is also designated as driving to the right, and transverse driving with a reverse driving direction is also designated as driving to the left. If, for example, the vehicle is a multidirectional stacker having a carrying fork, then the front side of the vehicle can, for example, be the side of the vehicle with the carrying fork. The transverse axis extends perpendicularly to the longitudinal axis.

The translational movement of the vehicle can, for example, be influenced exclusively by the driving direction switch and/or the driving direction adjustment element.

The present invention will now be explained in greater detail below under reference to an exemplary embodiment which is shown schematically in the drawings.

Figure 1:
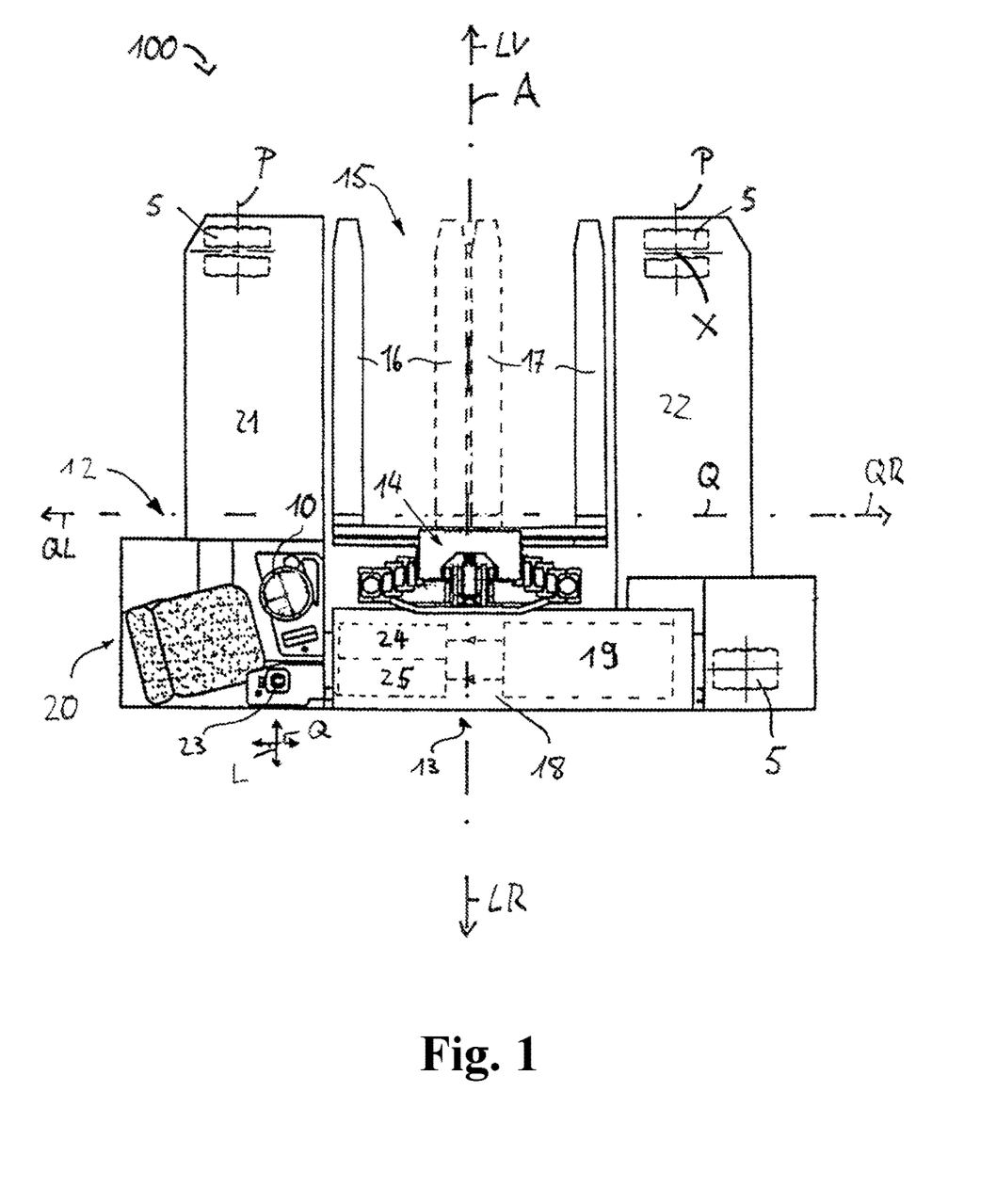
FIG. 1 shows a multidirectional transport vehicle using the example of a multidirectional stacker in a view from above during transverse driving.

The multidirectional transport vehicle, designated as a whole by 100 in FIG. 1, comprises a chassis 12 which is approximately U-shaped when viewed from above. On the crossbeam 13 of the U, the chassis 12 supports an upright post 14 on which a carrying fork arrangement 15 which can be raised and lowered is arranged. This carrying fork arrangement 15 is configured so that its fork arms 16, 17 are movable between a parted position shown by a solid line in FIG. 1 and an adjacent position shown by a broken line in FIG. 1 in order thus to be able to adapt the spacing between the fork arms 16, 17 to the particular goods to be transported.

A housing 18, which accommodates most of the assemblies and equipment required for operation of the multidirectional transport vehicle 100, as well as a battery arrangement 19, is arranged on the crossbeam 13 of the U.

FIG. 1 shows that a wheel 5, which is driven by a motor (which is not illustrated in the drawings), is indicated on the right and left on the crossbeam 13, the crossbeam 13 being concealed by the illustration of a control cab 20. According to FIG. 1, wheels 5 are provided in each case in the end region on the segments 21, 22 of the chassis 12 which extend upwards from the crossbeam 13. All the wheels 5 are rotatable about wheel axles P and are in each case arranged steerably about a steering axle X extending perpendicular to the drawing plane.

The control cab 20 shown at the left-hand end of the crossbeam 13 in FIG. 1 contains the operating devices to be actuated by an operator for operation of the multidirectional transport vehicle 100, including a steering wheel 10 and a joystick 23 with a rocker switch (which is not shown in FIG. 1) with two actuation axes extending perpendicular to one another.

The control cab 20 also comprises a device which is not illustrated in greater detail, for example, an "accelerator pedal" which predetermines the setpoint value for the drive power of the drive motors (which are not shown in the drawings) which is provided by control units 24, 25.

Figure 2:
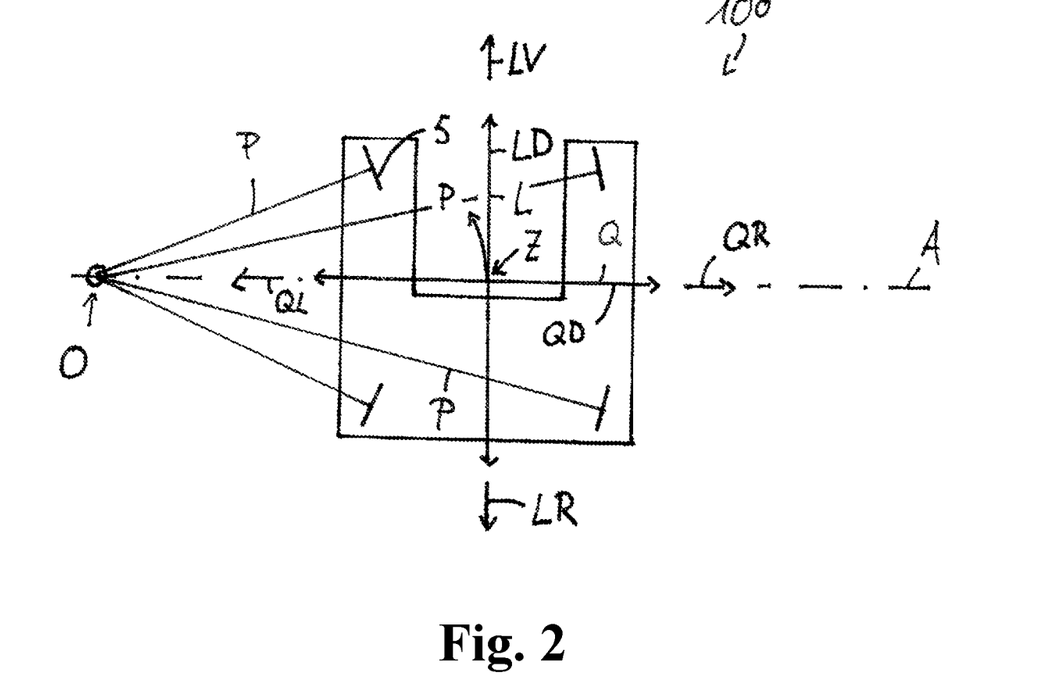
FIG. 2 shows a schematic illustration of the multidirectional stacker shown in FIG. 1 during longitudinal cornering.

FIG. 2 shows the vehicle illustrated in a FIG. 1 in a further schematic representation and cornering, wherein it is clear that in this case the axles P of the wheels 5 are aligned with a steering pole O, which is moved along a steering pole axis A by actuation of the steering target value transmitter 6.

FIGS. 1 and 2 also show the longitudinal axis L which defines a longitudinal direction LD and the transverse axis Q of the vehicle which defines a transverse direction QD. FIGS. 1 and 2 also show the two possible driving directions LV and LR, namely forward and backward in longitudinal driving, and the two possible driving directions QL, QR in transverse driving, namely left and right. The longitudinal axis L of the vehicle extends from the center of the vehicle to the side of the vehicle with the carrying fork.

Figure 3:
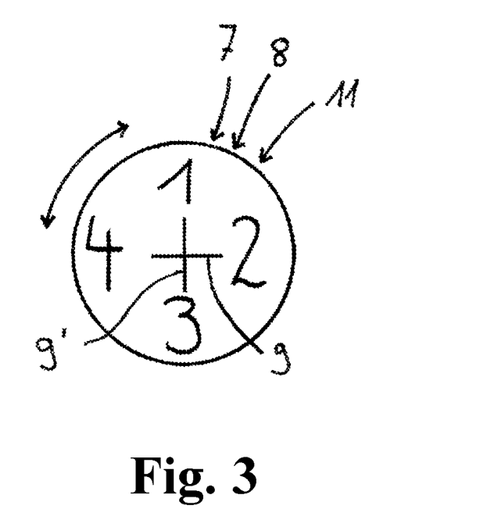
FIG. 3 shows a schematic representation of a driving direction adjustment element with an integrated driving direction switch.

FIG. 3 shows the driving direction switch 7 integrated into the driving direction adjustment element 8. The driving direction switch 7 comprises a rocker switch having two actuation axes extending perpendicular to one another and, resulting therefrom, four switch positions 1, 2, 3, 4. Each switch position is actuated by rocking the rocker switch to the corresponding switch position. The driving direction switch 7 is arranged in the vehicle so that two switch positions 1, 3 spaced apart from one another along the longitudinal axis L and two switch positions 2, 4 spaced apart from one another along the transverse axis Q of the vehicle are formed. FIG. 3 shows the driving direction adjustment element 8 in the non-actuated state.

The driving direction adjustment element 8 is designed, for example, as a joystick 23 which is rotatable about the vertical axis of the vehicle, the driving direction switch 7 being integrated into in the head of the joystick 23. When the driving direction adjustment element 8 rotates, the driving direction switch 7 rotates therewith.

Figure 4:
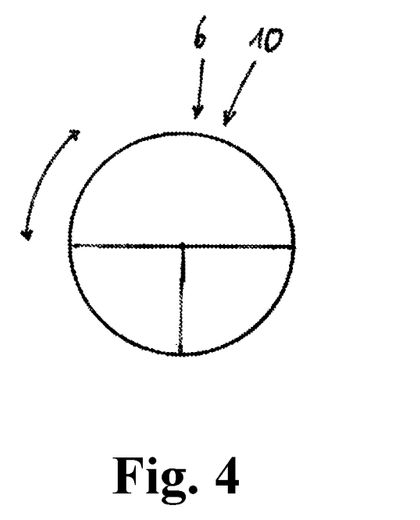
FIG. 4 shows a schematic illustration of the steering target value transmitter designed as a steering wheel.

FIG. 4 shows the steering target value transmitter 6 which comprises a steering wheel 10 in a non-actuated state.

Figure 5:
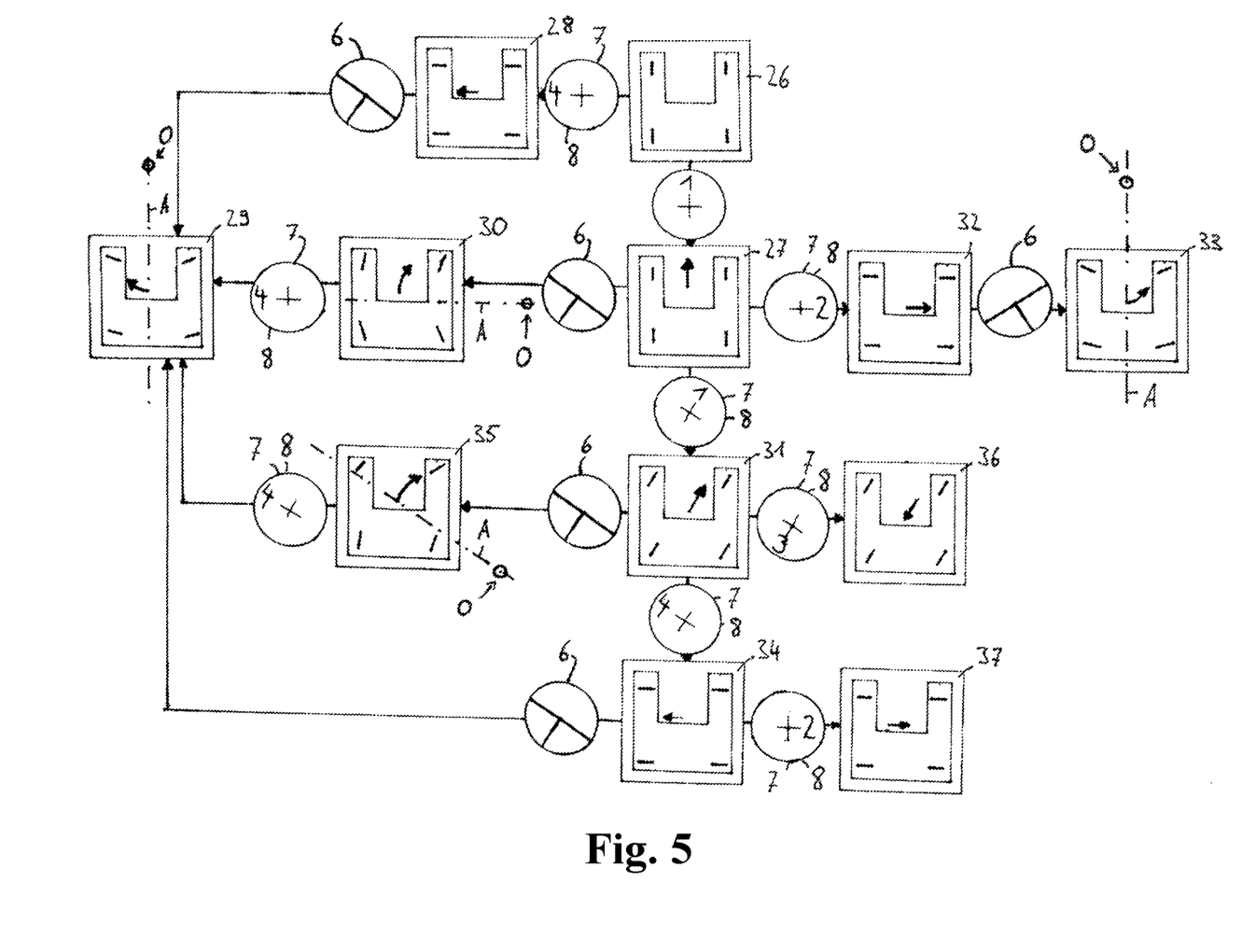
FIG. 5 shows a schematic illustration of driving states of the multidirectional transport vehicle after prior actuation of the steering target value transmitter and/or the driving direction switch and/or the driving direction adjustment element.

FIG. 5 clarifies the interaction of the steering target value transmitter 6 and/or the driving direction switch 7 and/or the driving direction adjustment element 8.

In the rocker switch shown in FIG. 5, unlike FIG. 3, only shows in each case one of the four possible switch positions, namely the one that has been actuated.

The multidirectional transport vehicle 100 shown in the drawings has an operating element via which the driving speed setpoint value can be selected. This can, for example, be an accelerator pedal. The accelerator pedal is actuated in each case in the driving states shown in FIG. 5 with the exception of the neutral position 26.

Starting from a neutral position 26, effecting one of the two switch positions arranged along the longitudinal axis of the vehicle, namely the switch position 1 facing the side of the vehicle with the carrying fork, leads to the vehicle moving in a longitudinal driving 27 in the forward driving direction LV.

If, instead, one of the two switch positions arranged along the transverse axis Q of the vehicle is effected, namely the switch position 4 arranged on the left in FIG. 5, then this leads to the vehicle moving in transverse driving 28 to the left in the driving direction QL. If, starting from this state, the steering wheel is actuated, then this leads to transverse cornering 29.

If, starting from the longitudinal driving 27, the steering wheel is actuated in the forward driving direction LV, then this leads to longitudinal cornering 30.

If, starting from the longitudinal driving 27 in the forward driving direction LV, the driving direction adjustment element 8 is actuated, then this leads to diagonal driving in a straight line 31.

Starting from the longitudinal driving 27 in the forward direction LV, effecting one of the two switch positions arranged along the transverse axis Q of the vehicle, namely the switch position 2 arranged on the right in FIG. 5, this leads to the vehicle moving in transverse driving 32 in the driving direction QR, i.e. to the right. This transverse driving in turn can be changed by actuation of the steering target value transmitter into transverse cornering 33.

Starting from the diagonal driving in a straight line 31, effecting one of the two switch positions arranged along the transverse axis Q of the vehicle, namely the switch position 4 arranged on the left in FIG. 5, this leads to the vehicle moving in transverse driving 34 in the driving direction QL, i.e. to the left. If, starting from this, the steering target value transmitter is actuated, then this leads again to transverse cornering 29.

If, starting from the diagonal driving in a straight line 31, the steering target value transmitter is actuated, then this leads to diagonal cornering 35, in which the steering pole axis A extends obliquely through the vehicle. Starting from this, effecting one of the two switch positions arranged along the transverse axis Q of the vehicle, namely the switch position 4 arranged on the left in FIG. 5, this leads to the vehicle again moving in transverse cornering 29.

Starting from the diagonal driving in a straight line 31, effecting one of the two switch positions arranged along the longitudinal axis L of the vehicle, namely the switch position 3 arranged at the bottom in FIG. 5, this leads to the vehicle moving in diagonal driving in a straight line 36 with a reverse driving direction. Thus, only the driving direction is reversed.

Starting from the transverse driving 34 in the driving direction QL, effecting one of the two switch positions arranged along the transverse axis Q of the vehicle, namely the switch position 2 arranged on the right in FIG. 5, this leads to the vehicle moving in transverse driving 37 with a reverse driving direction. Thus, again, only the driving direction is reversed.

Figure 6:
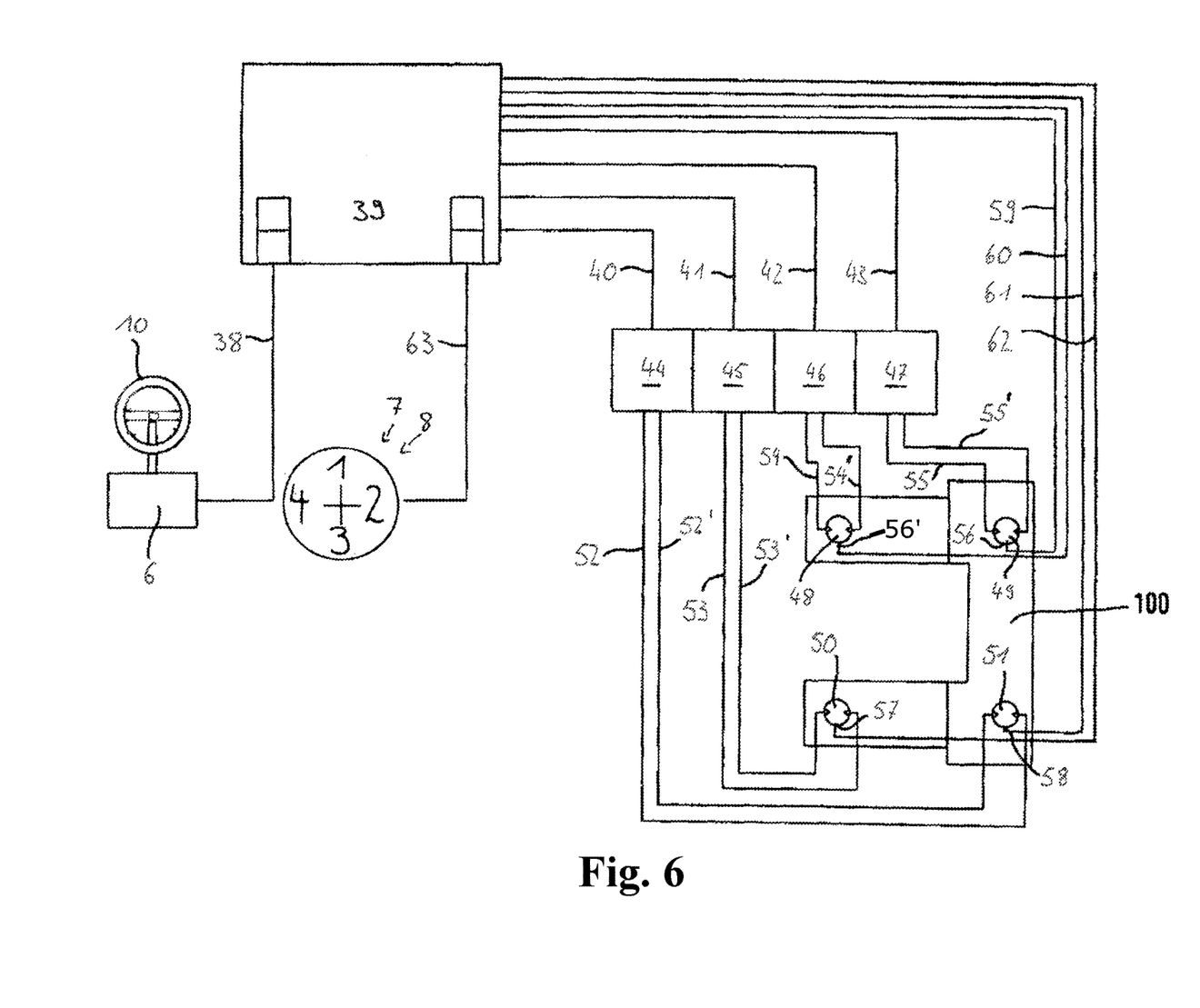
FIG. 6 shows a schematic representation of an exemplary embodiment of a steering system of a vehicle according to the present invention.

As FIG. 6 makes clear, the steering wheel 10 is connected to a steering target value transmitter 6 which converts the position of the steering wheel 10 into correlated electrical signals. These signals are delivered by an electrical cable 38 to the central control system 39. This converts the data received from the steering target value transmitter 6 into signals which are delivered via cables 40, 41, 42, 43, hydraulic valves 44, 45, 46, 47 for the purpose of actuating the steering devices 48, 49, 50, 51 of the wheels of the multidirectional transport vehicle 100.

Each of the steering devices 48, 49, 50, 51 comprises a hydraulic motor, which is connected via two hydraulic lines 52, 52'; 53, 53'; 54, 54'; 55, 55' to the hydraulic valves 44, 45, 46, 47, and is supplied with hydraulic fluid depending on the setpoint steering angle predetermined by the control system.

Each of the conventionally designed steering devices 48, 49, 50, 51 comprises a respective steering angle sensor 56, 56', 57, 58, which via electrical cables 59, 60, 61, 62, provide the central control system 39 with an electrical signal correlated with the respective actual steering angle, so that more specific control of the steering devices 48, 49, 50, 51 takes place.

The driving direction switch 7 and the driving direction adjustment element 8 are connected to the central control system 39 via a signal line 48.

The present invention is not limited to embodiments described herein; reference should be had to the appended claims.

LIST OF REFERENCE NUMERALS 100 multidirectional transport vehicle
1, 2, 3, 4 switch positions
5 wheels
6 steering target value transmitter
7 driving direction switch
8 driving direction adjustment element
9, 9' imaginary connecting lines
10 steering wheel
11 rocker switch
12 chassis
13 crossbeam
14 post
15 carrying fork arrangement
16, 17 fork arms
18 housing
19 battery arrangement
20 control cab
21, 22 segments of the chassis
23 joystick
24, 25 control units
26 neutral position
27 longitudinal driving in the forward driving direction
28 traverse driving direction to the left
29 traverse cornering
30 longitudinal cornering
31 diagonal driving in a straight line
32 traverse driving in the driving direction (right)
33 traverse cornering
34 traverse driving in the driving direction (left)
35 diagonal cornering
36 diagonal driving in a straight line with a reverse driving direction
37 traverse driving in a straight line with a reverse driving direction
38 electrical cable
39 central control system
40, 41, 42, 43 cables
44, 45, 46, 47 hydraulic valves
48, 49, 50, 51 steering device
52, 52', 53, 53' hydraulic lines
54, 54', 55, 55' hydraulic lines
56, 56', 57, 58 steering angle sensor
59, 60, 61, 62 electrical cables
63 signal line
A steering pole axis
L longitudinal axis
LD longitudinal direction
O steering pole
P wheel axle
Q transverse axis
QD transverse direction
LV forward driving direction
LR backward driving direction
QR right driving direction
QL left driving direction
X steering axles
Z center of rotation of the steering

What is claimed is:

1. A multidirectional transport vehicle comprising:
a longitudinal axis which defines a longitudinal direction;
a transverse axis which defines a transverse direction;
a steering system comprising,
  at least three wheels each of which is configured to be independently steerable, each of the at least three wheels having a wheel axle, and
  a steering target value transmitter which is configured to steer the at least three wheels,
wherein,
  a steering pole, on which each wheel axle of the at least three wheels is aligned when cornering, is moved along a steering pole axis by actuating the steering target value transmitter;
a driving direction switch comprising a limited number of separate switch positions, wherein exactly one switch position of the driving direction switch preselects exactly one respective rotational position of the steering pole axis relative to the multidirectional transport vehicle and preselects one of two driving directions facilitated thereby; and
a driving direction adjustment element which is different from the steering target value transmitter, the driving direction adjustment element being configured to change a preselectable rotational position of the steering pole axis.

2. The multidirectional transport vehicle as recited in claim 1, wherein the driving direction adjustment element is configured to change the preselectable rotational position of the steering pole axis in a continuously variable manner.

3. The multidirectional transport vehicle as recited in claim 1, wherein one of the following driving directions is preselectable via the driving direction switch:
- a longitudinal driving in a first driving direction;
- a longitudinal driving in a second driving direction which is opposite to the first driving direction;
- a transverse driving in a third driving direction; and
- a transverse driving in a fourth driving direction which is opposite to the third driving direction.

4. The multidirectional transport vehicle as recited in claim 1, wherein,
- the limited number of separate switch positions of the travel direction switch consists of four separate switch positions, and
- the travel direction switch is provided as a rocker switch comprising two actuation axes which extend perpendicular to one another and parallel with each of the longitudinal axis and the transverse axis of the multidirectional transport vehicle.

5. The multidirectional transport vehicle as recited in claim 1, wherein the driving direction switch is integrated into the driving direction adjustment element.

6. The multidirectional transport vehicle as recited in claim 1, wherein,
- the driving direction switch further comprises one or more of a feeler, a pulling element, a tilting element, a rocking element, and a rotary element,
- the driving direction adjustment element comprises a joystick, and
- the steering target value transmitter comprises a steering wheel.

7. The multidirectional transport vehicle as recited in claim 1, wherein a specific actuation of the driving direction switch always causes the steering pole axis to be brought into precisely a same rotational position relative to the multidirectional transport vehicle regardless of a rotational position of the multidirectional transport vehicle when the specific actuation takes place.

8. The multidirectional transport vehicle as recited in claim 1, wherein,
- an actuation of the driving direction switch after a prior actuation of the steering target value transmitter causes the steering pole axis to rotate into a rotational position which is perpendicular to a preselected driving direction, or, if the steering pole axis is already arranged in the rotational position, to remain in the rotational position,
- the position of the steering pole on the steering pole axis is maintained, and
- any rotation of the steering pole axis takes place so that a direction of rotation of the multidirectional transport vehicle effected by the steering target value transmitter is maintained.

* * * * *